United States Patent [19]

Magni et al.

[11] Patent Number: 5,294,697
[45] Date of Patent: Mar. 15, 1994

[54] PROCEDURE FOR THE PREPARATION OF COLORLESS HYDROCARBON RESINS

[75] Inventors: Ambrogio Magni; Attilio Sioli; Claudia Andena; Mario Ponzinibbi, all of Milan, Italy

[73] Assignee: Enichem Anic S.R.L., Palermo, Italy

[21] Appl. No.: 833,515

[22] Filed: Feb. 11, 1992

[30] Foreign Application Priority Data

Feb. 11, 1991 [IT] Italy .................. MI91A000346

[51] Int. Cl.⁵ ........................................... C08F 6/28
[52] U.S. Cl. ................................ 528/488; 528/499
[58] Field of Search ................ 528/488, 485, 499

[56] References Cited

U.S. PATENT DOCUMENTS

| | | | |
|---|---|---|---|
| 3,090,777 | 5/1963 | Antonsen et al. | 528/488 |
| 4,284,762 | 8/1981 | Miyata et al. | 528/488 |
| 4,369,306 | 1/1993 | Toyota et al. | 528/485 |
| 5,175,247 | 12/1992 | Magni et al. | 528/485 |

FOREIGN PATENT DOCUMENTS

| | | |
|---|---|---|
| 0035896 | 9/1981 | European Pat. Off. . |
| 0118092 | 9/1984 | European Pat. Off. . |
| 0412597 | 2/1991 | European Pat. Off. . |

*Primary Examiner*—Joseph L. Schoffer
*Assistant Examiner*—Tom Weber
*Attorney, Agent, or Firm*—Oblon, Spivak, McClelland, Maier & Neustadt

[57] ABSTRACT

A procedure is described for the preparation of colorless hydrocarbon resins having a higher thermal stability than similar products in the known art. The procedure involves the treatment of polymeric mixtures deriving from the (co)polymerization by means of Friedel-Crafts catalysts of hydrocarbons or mixtures of ethylenically unsaturated hydrocarbons, with an organometallic compound of Magnesium and/or Lithium, the separation of the inorganic residues and the final removal of the volatile organic products.

12 Claims, No Drawings

PROCEDURE FOR THE PREPARATION OF COLORLESS HYDROCARBON RESINS

The present invention relates to a new procedure for the preparation of resins from unsaturated hydrocarbon fractions and more specifically to a new procedure to improve the colour and thermal stability of the resins and resulting products.

It is well-known that the cationic polymerization of unsaturated hydrocarbon mixtures with Friedel-Crafts catalysts allows for the preparation of resinous materials. As an example of polymerizations starting from catalytic systems, reference can be made to the polymerization of unsaturated hydrocarbon mixtures based on monomers of the C4-C5 olefinic and diolefinic type or of the higher aliphatic, cycloaliphatic and aromatic type. Other examples of polymerizations starting from Friedel-Crafts catalytic systems are the polymerization and copolymerization of monomers of natural origin, such as terpenes, with other unsaturated organic compounds. These polymerizations are generally carried out in flow reactors, even though batch reactors or of the semiflow kind may be used and in the presence of an inert diluent as the reaction is normally exothermic. However, with adequante stirring and cooling systems, the temperature can be controlled and the reaction carried out without the use of a diluent.

Various inert diluents for the reaction may be used. Representative examples of inert diluents are aliphatic hydrocarbons such as pentane, hexane and heptane, aromatic hydrocarbons such as toluene and benzene, and residuous hydrocarbons which are left unreacted from the reaction.

A wide temperature range may be used for the polymerization reaction. The polymerization is generally carried out at temperatures ranging from $-20°$ C. to $+120°$ C., although the range from $0°$ C. to $70°$ C. is preferable.

The reaction pressure is not a critical factor and can be sub-atmospheric or super-atmospheric. Generally the reaction is most suitably carried out at the autogenous pressure created in the reactor under the operating conditions adopted.

The reaction time is also not of paramount importance and can vary from a few seconds to 2 or more hours. The resins thus obtained normally have a colour varying from light yellow to brown depending on the composition of the polymerized load and the polymerization conditions, and are suitable for use in formulations for numerous commercial applications.

British Patent 835.788 discloses that the colour of hydrocarbon resins can be advantageously improved by controlling the water content of the hydrocarbon fractions submitted to polymerization and the quantity of Friedel-Crafts catalyst used.

More recently, E.P. Application 82301558 claims a procedure for the production of light-coloured resins which involves controlling the content of cyclodiene monomers in the load with values lower than 0.5% by weight.

Aromatic resins having a light colour and high thermal stability can be obtained by putting the charged product to be polymerized in contact with a dienophilous substance before the polymerization (U.S. Pat. Nos. 4,102,843 and 4,230,840).

More specifically, basically colourless resins can be obtained by means of the cationic polymerization of pure monomers. For example, beta-pinene is transformed into a colourless resin by polymerization with catalytic quantities of an organometallic compound of aluminium not containing halogen and by activating the system with the addition of a controlled quantity of water and subsequent addition of an organic halide (E.P. Appl.84308674.5).

Light-coloured resins can also be obtained by means of the catalytic hydrogenation of hydrocarbon resins produced by cationic polymerization with Friedel-Crafts catalysts (UK 1176443), however this method has evident disadvantages mainly due to a change in the physico-chemical characteristics and behaviour of the resin and to a rapid loss in the activity of the hydrogenation catalyst.

It is therefore evident from the known art, that no general solution has yet been found for the necessity of having colourless hydrocarbon resins obtained by the cationic polymerization of unsaturated hydrocarbon mixtures to satisfy the growing demands for quality of the various areas of application.

A former Patent Application (IT. 21493A/89) describes a new method for the removal of catalytic residues based on aluminium trichloride from polymeric mixtures which involves the use of organometallic reagents. This method, apart from allowing the effective removal of the catalytic residues from the polymerized mixtures, produces resins having a higher thermal stability and lighter colour with respect to the resins of the known art. These resins however, still have a coloured residue, which, although very slight, does not allow them to be used in the product of end-products which require a complete absence of colour.

The present invention consequently relates to a general procedure for obtaining colourless and thermally stable resins from the polymerization products via Friedel-Crafts catalysts of mixtures of ethylenically unsaturated hydrocarbons, which overcomes the above-mentioned disadvantages and draw-backs of the known art, and the resins thus obtained.

It has, in fact, been unexpectedly found that the treatment of the reacted masses resulting from the polymerization via Friedel-Crafts with an organometallic compound of lithium and/or magnesium under suitable conditions, produces basically colourless hydrocarbon resins, having a high thermal stability, all the other physico-chemical and behaviour properties of the resins obtained under the same polymerization conditions remaining practically unaltered.

In accordance with this, the present invention relates to a method for the complete decolouring of the polymeric resins obtained by the polymerization of mixtures of ethylenically unsaturated hydrocarbons, which involves the following basic operations:

treatment of the polymerization mixture with an organometallic compound of lithium and/or magnesium;

separation of the inorganic residues;

recovery of the resin by removing the volatile organic residues.

This procedure produces colourless or very lightly-coloured resins having a high thermal stability, which naturally form an integral part of the present invention.

The procedure in accordance with the present invention, includes in particular the addition of an organometallic reactant selected from the group of metal-alkyls, metal-alkylhydrides and metal-hydrides of a metal selected from magnesium and lithium, to the reagent mass resulting from the polymerization reaction; lithium-n-butyl and magnesium-diethyl or magnesium-dinormal-butyl are preferred.

The reaction between the mixture resulting from the polymerization reaction and the above organometallic derivative is generally carried out at temperatures ranging from $-20°$ C. to $+120°$ C., althought it is preferable to use a range of $+20°$ C. and $+70°$ C.

The quantity of organometallic reagent used is in relation to the amount of Friedel-Crafts catalyst used in the polymerization. An organometallic/$AlCl_3$ molar ratio higher than 0.2 may be used, although to obtain the best effects from the treatment, it is preferable to operate at an organometallic/$AlCl_3$ molar ratio which is higher than 0.5.

The reaction pressure is not a critical factor and can be either sub-atmospheric or super-atmospheric. The reaction is generally carried out at the autogenous pressure created in the reactor under the operating conditions adopted.

The reaction time is also not of paramount importance and the reaction times can vary from a few minutes to 2 or more hours, during which the progressive clarification of the reagent mass takes place.

The reaction can be carried out in flow, semi-flow or batch reactors.

The organometallic derivative can be used either in its pure state or in a diluted solution in an inert diluent. Examples of inert diluents are aliphatic hydrocarbons such as pentane, hexane and heptane, aromatic hydrocarbons such as toluene and benzene.

An equal volume of water, or an aqueous solution of an acid or base, is then added to the resulting product, preferably operating with aqueous solutions of from 0.5 to 5 n of sodium hydroxide, at the same temperature as the reaction with the organometallic derivative or, preferably, at room temperature and for periods ranging from 5 minutes to 2 hours under vigorous stirring. The settled organic phase, after the possible filtration of any inorganic solids formed during the treatment with the aqueous phase (these solids do not form or at least in a very limited amount when the product is washed with an aqueous solution of an acid), is distilled in a vapor stream heated to 250° C. in an inert nitrogen atmosphere to separate the volatile organic residues from the resin.

The resins of the present invention are obviously used in all the fields of application described for resins in the known art; among these are formulations for both solvent and hot melt adhesives, inks, oils etc.

Having described the general aspects of this invention, the following examples are intended to provide an illustration of some of the details, but do not limit the invention in any way.

All compositions and percentages indicated, if not otherwise specified, are expressed by weight.

EXAMPLE 1

850 g of a selected cut of hydrocarbon monomers from steam-cracking having the composition shown in Table 1 are charged into a 2 liter glass reactor, equipped with a cooling jacket and mechanical stirrer. Maintaining the temperature of the reagent mixture at between $+15°$ C. and $+30°$ C. by means of a circulating cooling liquid, 10.2 g of $AlCl_3$ (76.7 moles) are poured into the reactor under stirring, in form of a complex with HCl and xylene, prepared separately by bubbling hydrochloric acid in a suspension of Aluminium trichloride and xylene in a molar ratio of 1/1, and the mixture is left to react for 40 minutes. The polymerized mixture is then transferred to a 3 liter glass flask equipped with a mechanical stirrer and containing 800 grams of a 4 molar aqueous solution of sodium hydroxide under vigorous stirring. After 30 minutes of treatment with the sodium hydroxide, the stirring is stopped and the organic phase is left to settle from the aqueous phase.

The resin is then separated from the polymeric solution by stripping the volatiles in a steam flow at 250° C. The properties of the resins obtained are shown in column (I) in Table 2.

EXAMPLE 2

850 g of the hydrocarbon cut having the composition shown in Table 1 are polymerized under the same conditions as Example 1. At the end of the polymerization, 56.6 ml of a solution of magnesium dinormalbutyl 0.67 molar in hexane are added to the polymerized mixture and the reaction continued for 15 minutes at a constant temperature of $+120°$ C. The mixture clarified by the treatment with magnesium dinormalbutyl is then transferred to a 3 liter glass flask equipped with a mechanical stirrer and containing 800 g of a 4 molar aqueous solution of sodium hydroxide kept under vigorous stirring.

After 30 minutes of treatment with the sodium hydroxide, the stirring is stopped and the organic phase is left to settle from the aqueous phase. The resin from the filtered organic phase is then separated by stripping the volatiles in a steam flow at 250° C. The properties of the resin obtained are shown in column (II) of Table 2.

EXAMPLE 3

The same procedure is used as described in Example 2 with 113 ml of the 0.67 molar solution of dinormalbutyl. The properties of the resin obtained are shown in column (III) of Table 2.

EXAMPLE 4

The same procedure is used as described in Example 2 with 226 ml of the 0.67 molar solution of magnesium dinormalbutyl. The properties of the resin obtained are shown in column (IV) of Table 2.

EXAMPLE 5

The same procedure is used as described in Example 2 with 23.9 ml of a 1.6 molar solution of lithium normalbutyl in hexane. The properties of the resin obtained are shown in column (V) of Table 2.

EXAMPLE 6

The same procedure is used as for Example 5 with 47.8 ml of a 1.6 molar solution of lithium normalbutyl in hexane. The properties of the resin obtained are shown in column (VI) of Table 2.

EXAMPLE 7

The same procedure is used as for Example 5 with 95.8 ml of a 1.6 molar solution of lithium normalbutyl in hexane. The properties of the resin obtained are shown in column (VII) of Table 2.

EXAMPLE 8

850 g of a mixture composed of xylene (600 g), beta-pinene (195 g), alpha-pinene and other less reactive terpenes (55 g), are charged into a 2 liter glass reactor, equipped with a cooling jacket and mechanical stirrer. The mixture is polymerized by adding 2.23 g (16.8 mmoles) of $AlCl_3$ in form of complex with HCl and xylene, prepared according to the procedure described in Example 1.

After 50 minutes, the polymerized mixture is transferred to a 3 liter glass flask equipped with a mechanical stirrer and containing 800 g of a 4 molar aqueous solution of sodium hydroxide kept under vigorous stirring. After 30 minutes of treatment with the sodium hydroxide, the stirring is stopped and the organic phase is left to settle from the aqueous phase. The resin is then separated from the polymeric solution by stripping the volatiles in a steam flow at 250° C. The properties of the resin obtained are shown in column (I) of Table 3.

EXAMPLE 9

850 g of a mixed composed of xylene (600 g), beta-pinene (195 g), alpha-pinene and other less reactive terpenes (55 g), are polymerized under the same conditions described in Example 8.

At the end of the polymerization, 65 ml of a solution of magnesium diethyl 0.52 molar in hexane are added to the polymerized mixture and left to react for 15 minutes keeping the temperature at 145° C.

The mixture clarified by the treatment with magnesium diethyl is then transferred to a 3 liter glass flask equipped with a mechanical stirrer and containing 800 g of a 4 molar aqueous solution of sodium hydroxide kept under vigorous stirring.

After 30 minutes of treatment with the sodium hydroxide, the stirring is stopped and the organic phase is left to settle from the aqueous solution.

The resin is then separated from the filtrated organic phase by stripping the volatiles in a steam flow at 250° C.

The properties of the resin obtained, which are completely colourless, are shown in column (II) of Table 3.

TABLE 1

| COMPONENTS | % WEIGHT |
| --- | --- |
| 1-butene + isobutene | 1.51 |
| 1,3-butadiene | 3.01 |
| n-butane | 0.32 |
| trans-2-butene | 0.93 |
| cis-2-butene | 1.26 |
| 1,2-butadiene | 0.38 |
| 3-methyl-1-butene | 2.10 |
| isopentane | 7.65 |
| 1,4-pentadiene | 5.76 |
| 2-butine | 0.73 |
| 1-pentene | 10.63 |
| 2-methyl-1-butene | 2.99 |
| n-pentane | 18.65 |
| isoprene | 11.37 |
| trans-2-pentene | 7.60 |

TABLE 1-continued

| COMPONENTS | % WEIGHT |
| --- | --- |
| cis-2-pentene | 3.56 |
| 2-methyl-2-butene | 1.89 |
| trans-1,3-pentadiene | 7.10 |
| cyclopentadiene | 1.16 |
| cyclopentene | 5.76 |
| cis-1,3-pentadiene | 3.65 |
| various saturated products | 1.99 |

TABLE 2

| EXPERIMENT | (I) | (II) | (III) | (IV) | (V) | (VI) | (VII) |
| --- | --- | --- | --- | --- | --- | --- | --- |
| $AlCl_3$, mmoles | 76.7 | 76.7 | 76.7 | 76.7 | 76.7 | 76.7 | 76.7 |
| $Mg(nBu)_2$, mmoles | — | 38.3 | 76.7 | 153.4 | — | — | — |
| LiBu, mmoles | — | — | — | — | 38.3 | 76.7 | 153.4 |
| Filler g. | 850 | 850 | 850 | 850 | 850 | 850 | 850 |
| Polym. temp. (°C.) | 15–25 | 15–21 | 15–19 | 15–27 | 15–21 | 15–22 | 15–22 |
| Resin g. | 288 | 291 | 264 | 269 | 284 | 277 | 283 |
| Softening point of resin (°C.) | 99 | 101 | 99 | 98 | 100 | 100 | 98 |
| Mn, g/mole (GPC) | 1107 | 1067 | 1117 | 1113 | 1168 | 1153 | 1089 |
| Gardner colour (ASTM D1544) (1) | 7– | 2+ | 1– | 1– | 6+ | 5– | 1+ |
| Gardner colour 3 h/150° C. (1) | 12+ | 8– | 5+ | 5 | 11 | 9 | 6– |

(1) measured on a 50% solution by weight in toluene

TABLE 3

| EXPERIMENT | (I) | (II) |
| --- | --- | --- |
| $AlCl_3$, mmoles | 16.8 | 16.8 |
| $Mg(Et)_2$, mmoles | 38.3 | 38.3 |
| Filler, g. | 850 | 850 |
| Polymerization temperature range °C. | 30–70 | 30–70 |
| Resin, g. | 189 | 193 |
| Resin softening point °C. (ASTM E28) | 113 | 109 |
| Mn, g/mole (GPC) | 938 | 913 |
| Gardner colour of the resin (ASTM D1544) (1) | 3– | <1 |

(1) Measured on a 50% by weight solution in toluene

We claim:
1. Method for decoloring polymeric resins obtained by polymerizing mixtures of ethylenically unsaturated hydrocarbons in the presence of Friedel-Crafts catalyst, comprising
   a) treating polymeric mixtures obtained by polymerizing mixtures of ethylenically unsaturated hydrocarbons in the presence of Friedel-Crafts catalyst with an organometallic compound of lithium and/or magnesium;
   b) treating the resulting mixture with water or an acid or base aqueous solution;
   c) separating and recovering the organic phase.

2. Method in accordance with claim 1 wherein the organometallic compound is lithium and/or magnesium selected from the group consisting of metalalkyls, metalhydrides and metalalkylhydrides.

3. Method in accordance with claim 1 wherein the treatment of the polymerization mixture with an organometallic compound of lithium and/or magnesium is carried out at a temperature ranging from −20° C. to +120° C.

4. Method in accordance with claim 1 wherein the treatment referred to in item b) is carried out at room temperature.

5. Method in accordance with claim 1 wherein the treatment of the mixture specified in b) is carried out with an acid or base solution from 0.5N to 5N.

6. Method in accordance with claim 5 wherein the treatment is preferably carried out with a solution of sodium hydroxide.

7. Method in accordance with claim 2 wherein the organometallic compound is a lithium organometallic compound.

8. Method in accordance with claim 7 wherein the lithium organometallic compound is lithium normalbutyl.

9. Method in accordance with claim 2 wherein the organometallic compound is a magnesium organometallic compound.

10. Method in accordance with claim 6 wherein the magnesium organometallic compound is magnesium-diethyl or magnesium-dinormalbutyl.

11. Method in accordance with claim 1 wherein treating the polymeric resins with an organometallic compound of lithium and/or magnesium is carried out in the presence of such a quantity of organometallic compound as to have a molar ratio with respect to the Friedel-Crafts catalyst higher than or equal to 0.2.

12. Method in accordance with claim 11 wherein the molar ratio of organometallic compound to Friedel-Crafts catalyst is higher than 0.5.

* * * * *